United States Patent Office 2,841,913
Patented July 8, 1958

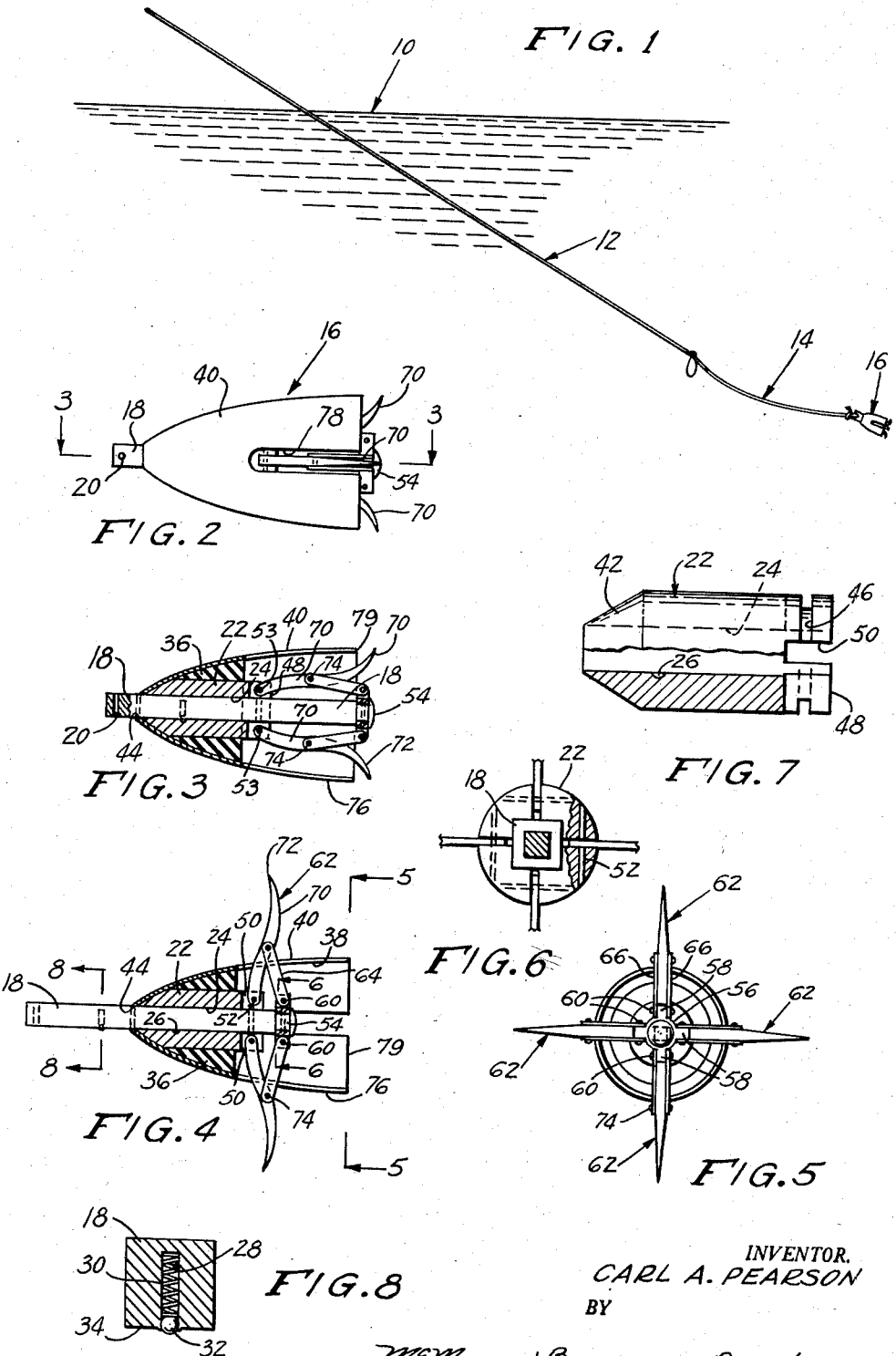

2,841,913

EXPANDER FISH LURE

Carl A. Pearson, Moline, Ill.

Application February 21, 1956, Serial No. 566,923

2 Claims. (Cl. 43—37)

This invention relates generally to an improved expanding fish lure of a type involving spears which are arranged to be expanded or extended by relative movement of parts of the lure, produced either by a striking fish or by pull exerted on a fishing line to which the lure is attached.

The primary object of the invention is to provide a more practical, reliable and efficient lure of this kind which is simple in construction, is composed of a small number of easily assembled parts, and which does not depend upon spring actuating means for its expanding action.

Another object of the invention is to provide a lure of the character set forth, which can be made in attractive, rugged, and serviceable forms at relatively low cost, and is highly acceptable for the purpose intended.

These together with other objects and advantages which will become apparent reside in the details of construction and operation as more fully hereinafter described and claimed, reference being had to the accompanying drawings forming part hereof, wherein like numerals refer to like parts throughout the several views, and in which:

Figure 1 is a schematic view showing a lure of the invention secured on the leader of a fishing line lowered in a body of water;

Figure 2 is a side elevational view of said lure;

Figure 3 is a longitudinal sectional view taken substantially on line 3—3 of Figure 2;

Figure 4 is a sectional view similar to Figure 3 showing the spears in expanded fish-impaling positions;

Figure 5 is a forward elevational view looking substantially from line 5—5 in Figure 4;

Figure 6 is an enlarged fragmentary sectional view taken substantially on line 6—6 of Figure 4, a portion being broken away;

Figure 7 is an enlarged side elevational view of the sleeve of the lure, portions being broken away and in section; and, Figure 8 is an enlarged transverse sectional view taken substantially on line 8—8 showing detent means.

Referring to the drawings in detail, Figure 1 shows a body of water 10 in which is disposed a fishing line 12 having a leader 14 to which is secured a lure, indicated generally at 16, of the invention.

The fish lure 16 comprises a longitudinally elongated shaft 18, preferably of rectangular cross section, having a forward end portion 19 having therein a transverse bore 20 through which the leader 14 is secured. Slidably supported on the shaft 18 is a longitudinally elongated sleeve 22 having extending therethrough an axial bore 24, non-rotatably receiving the shaft 18, and having a detent recess 26 in one side thereof. The shaft 18 includes a transverse socket 28 in a side 34 thereof in which is secured a compressed coil spring 30, see Figure 8 to which is secured a detent ball 32. The spring urged ball 32 and the recess 26 comprise detent means for releasably retaining the sleeve 22 in a forward and set position on the shaft 18.

The sleeve 22 has circumposed thereon a rearwardly tapered resilient sleeve 36 which grippingly engages the sleeve 22 and which engages the inner surface 38 of a forwardly tapering housing 40. The housing 40 grippingly engages the resilient sleeve 36 so as to be movable with the sleeve 22. The sleeve 22 includes a forward conical end 42 which conforms to the forward end of the housing 40 which has an opening 44 passing the shaft 18 and permitting reciprocable movement thereof relative to the housing 40.

As shown in Figure 7, the sleeve 22 includes a plurality of circumferential grooves 46 in its outer surface which are located near the rear end 48 of the sleeve 22 and communicate with outer end portions of a plurality of radial slots 50 which extend from the sleeve bore 24 to the outer surface of the sleeve 22. In the illustrated form of the invention, four slots 50 are shown in diametrically opposed relation. A wire 52 is circumposed about the sleeve 22 in the grooves 46 so as to define pivots 53 where the wire 52 extends across the slots 50.

Secured, as indicated at 54 on the rear end of the shaft 18 is an annular lateral flange 56 having thereon radially extending lugs 58 aligned with the slots 50. The lugs 58 are traversed by pivot pins 60.

A compressed lever assembly 62 is related to each slot 50 and comprises a short rear lever 64 composed of a pair of bars 66 secured at one end on a pivot 60 at opposite sides of a lug 58 and pivoted at their other ends to an intermediate part of a relatively long forward lever 70, as indicated at 74, whose inner end is pivoted on a pivot 53 of the wire 52 in a slot 50. The outer end of the long lever 70 is sharpened at 72 to serve as a spead to become impaled in the mouth of a fish, as hereinafter described.

The housing 40 is extended rearwardly beyond the sleeve 22 to define a skirt 76 which has therein longitudinal slots 78 in alignment with the sleeve slots 50 and opening through the rear end 79 of the skirt 76. The spear levers 70 extend radially outwardly through the slots 78 with their sharpened ends 72 extending radially outwardly from the skirt 76 when the lever assembled 62 are extended, as seen in Figure 4.

When a fish takes the lure and grips the housing 40, and in so doing pulls the housing and the sleeve 22 rearwardly along the shaft 18, the spear levers 70 are moved outwardly so as to become impaled in the mouth of the fish. Additionally, when the fisherman feels the strike on the fishing line 12 and pulls on the fishing line 12, the housing 40 and the sleeve 22 are more forcibly and further moved rearwardly relative to the shaft 18, so as to further drive the spear points into the mouth of the fish.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. In an expander fish lure, an elongated shaft having forward and rear ends, a sleeve shorter than said shaft, said sleeve having an axial bore slidably and non-rotatably receiving said shaft, said sleeve having forward and rear ends, said sleeve having circumferentially spaced radial slots opening through its rear end and reaching from the sleeve bore to the outer surface of the sleeve, pivots on said sleeve extending across said radial slots, radial lugs mounted on the rear end of the shaft and aligned with said radial slots, relatively short rear levers having inner ends pivoted on said lugs, relatively long forward levers having inner ends in related radial slots and pivoted on pivots therein, said forward levers having sharpened outer ends and serving as fish-impaling spears, the outer ends of the short rear levers being pivoted to intermediate portions of said long levers, and releasable detent means acting between said sleeve and said shaft for releasably retaining the sleeve in a forward and set position on said shaft wherein the spear levers are retracted, said detent means being releasable by rearward pull on said sleeve and accompanying rearward movement of the sleeve relative to the shaft in which said spear levers are moved radially extended fish-impaling positions, and a longitudinally elongated housing circumposed on said sleeve and having a portion extending rearwardly beyond said sleeve and defining a skirt enclosing the long and short levers in the retracted positions thereof, said skirt having longitudinal slots therein aligned with said radial slots and through which the spear levers pass to their extended positions.

2. In an expander fish lure, an elongated shaft having forward and rear ends, a sleeve shorter than said shaft, said sleeve having an axial bore slidably and non-rotatably receiving said shaft, said sleeve having forward and rear ends, said sleeve having circumferentially spaced radial slots opening through its rear end and reaching from the sleeve bore to the outer surface of the sleeve, pivots on said sleeve extending across said radial slots, radial lugs mounted on the rear end of the shaft and aligned with said radial slots, relatively short rear levers having inner ends pivoted on said lugs, relatively long forward levers having inner ends in related radial slots and pivoted on pivots therein, said forward levers having sharpened outer ends and serving as fish-impaling spears, the outer ends of the short rear levers being pivoted to intermediate portions of said long levers, and releasable detent means acting between said sleeve and said shaft for releasably retaining the sleeve in a forward and set position on said shaft wherein the spear levers are retracted, said detent means being releasable by rearward pull on said sleeve and accompanying rearward movement of the sleeve relative to the shaft in which said spear levers are moved radially extended fish-impaling positions, and a longitudinally elongated housing circumposed on said sleeve and having a portion extending rearwardly beyond said sleeve and defining a skirt enclosing the long and short levers in the retracted positions thereof, said skirt having longitudinal slots therein aligned with said radial slots and through which the spear levers pass to their extended positions, said detent means comprising a spring-pressed ball detent carried by said shaft, and a detent recess formed in the sleeve bore.

References Cited in the file of this patent

UNITED STATES PATENTS

| | | |
|---|---|---|
| 95,755 | Angers | Oct. 12, 1869 |
| 2,572,817 | Reed | Oct. 23, 1951 |
| 2,747,412 | Hanks | May 29, 1956 |